A. E. KINSLEY.
COLLAPSIBLE ANIMAL TRAP.
APPLICATION FILED APR. 3, 1913.
1,246,112. Patented Nov. 13, 1917.
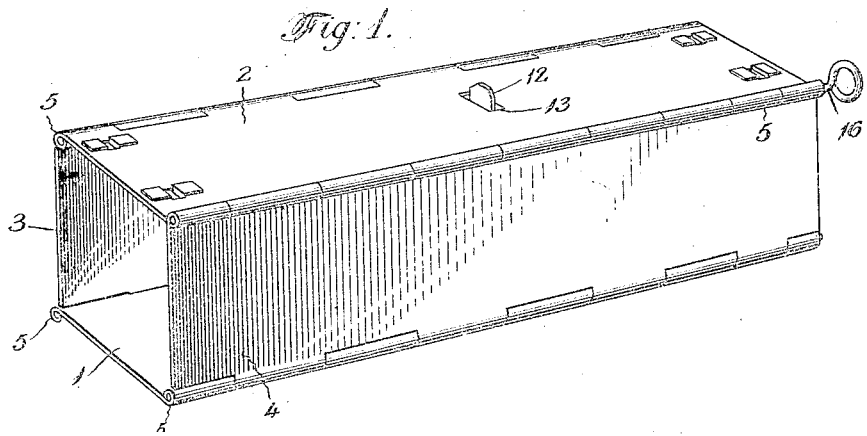
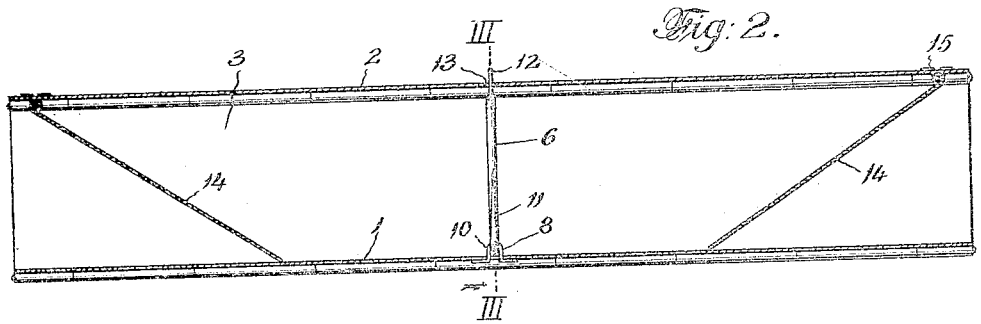
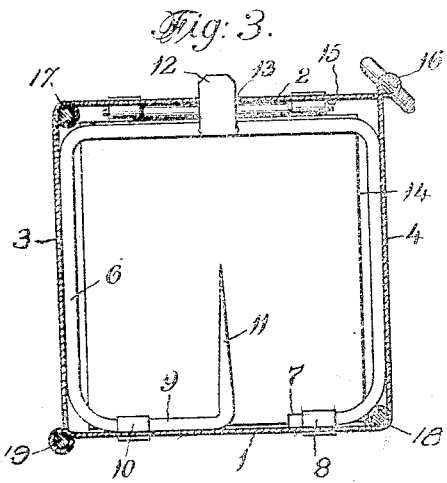
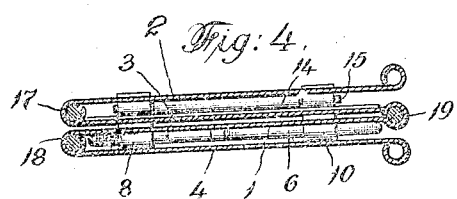

UNITED STATES PATENT OFFICE.

ALBERT E. KINSLEY, OF ONEIDA, NEW YORK, ASSIGNOR TO ONEIDA GAME TRAP CO., INC., OF ONEIDA, NEW YORK, A CORPORATION OF NEW YORK.

COLLAPSIBLE ANIMAL-TRAP.

1,246,112.  Specification of Letters Patent.  Patented Nov. 13, 1917.

Application filed April 3, 1913. Serial No. 758,720.

*To all whom it may concern:*

Be it known that I, ALBERT E. KINSLEY, residing at Oneida, in the county of Madison and State of New York, have invented certain new and useful Improvements in Collapsible Animal-Traps, of which the following is a specification.

This invention relates to an animal trap, and an object thereof is to provide a trap of an efficient character which may be collapsed into a small compass so as to facilitate shipping, and for the attainment of other analogous purposes.

A further object is to provide a trap, which, in its operable condition, will comprise a rectangular structure having open ends closed by pivotally mounted flaps, to provide a means for maintaining the structure in operable condition, and to provide means adapted for retaining a portion of bait.

A further and more detailed object is to provide the walls of the rectangular structure as separately formed members hinged together, and to dispose the hinges in such relation that the end flaps and the means referred to for holding the structure in extended condition, will be readily accommodated between the collapsed walls of the structure, in such manner, that the walls may be swung into substantial parallelism as clearly depicted in the drawings.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:—

Figure 1 is a perspective view of a complete trap constructed in accordance with the provisions of this invention, in its distended condition;

Fig. 2 is a longitudinal, vertical, sectional view of the structure shown in Fig. 1;

Fig. 3 is an enlarged, transverse, vertical, sectional view taken substantially on the plane of line III—III of Fig. 2;

Fig. 4 is a transverse, sectional view similar to Fig. 3 and showing the parts in their collapsed condition; and Fig. 5 is a detailed elevational view of a detachable locking pin employed.

Referring to the drawings for a detailed description of the invention, and assuming the structure to be in distended condition as in Figs. 1, 2, and 3, the numeral 1 indicates the bottom wall, 2 the top wall, and 3 and 4 the opposite side walls. These walls may comprise any suitable material such as the sheet metal illustrated in the drawings, or they may be made up as independent frames covered with a wire screen, if desired. Each wall is preferably somewhat longer than wide, and the walls are hinged together along their side edges as by hinged joints 5.

At a point midway in the length of the structure is pivotally mounted a frame 6, preferably comprising a severed length of wire, or similar material, bent into shape to fit closely within the four walls of the trap. The shape of this frame is best shown in Fig. 3 wherein it is seen that one end, as 7, of the wire of which it is composed, lies flat upon the bottom wall 1 of the trap and is pivotally connected thereto by a hinge member 8 fixed to the bottom wall 1. The frame extends upwardly along the side wall 4, across the top, downwardly along the opposite side wall 3, and the opposite end portion, as 9, extends along the bottom wall 1 in alinement with the end 7, and is pivotally connected to the wall 1 by a hinge member 10. Either of the ends 7 or 9 may be extended to provide a convenient means for attaching the bait. In the drawings the end 9 is shown extended and bent vertically upwardly as at 11, for this purpose. As clearly shown in Fig. 2 the portion 11 lies in the same plane as do all other portions of the frame.

In order to retain the frame 6 in the position shown in Figs. 1, 2, and 3, a lug 12 is formed thereon and projects through an aperture 13 formed preferably in the upper wall 2 of the trap.

The structure formed by the walls 1, 2, 3, and 4, is open at its opposite ends, and these ends are closed by pivotally mounted flaps or doors 14, each door being supported upon a hinge rod 15 carried by the upper wall 2. The flaps 14 are of a width to swing freely between the side walls 3 and 4, but are somewhat longer than the space between the bottom and top walls 1 and 2. In operation, therefore, they will normally assume a diagonal position as seen in Fig. 2.

The flaps 14 may comprise a section of sheet metal as shown, or, like the walls of the trap, they may be formed of wire screening either on a frame or otherwise, as may be found desirable.

An animal seeking the bait carried by the part 11 of the frame 6 within the trap will lift the flap with perfect ease, but once he has passed sufficiently far for the flap to fall behind him, or even for the lower edge of the flap to engage his body, he will be prevented from emerging.

To improve the resistance offered by the flaps 14, the lower edges may be provided with needle points or otherwise shaped, as desired, for engaging the body of the animal in the event he should endeavor to withdraw when only partly inside.

He would find the inward passage considerable easier than the outward passage, and would be induced thereby to continue the inward passage.

The flaps 14 at both ends of the structure are identical and the description of one applies with equal accuracy to both.

In order to facilitate the collapse of my structure I have made one of the hinge joints 5 between the walls thereof separable. For this purpose I have formed the hinge rod 16 of that hinge joint bodily removable, so that the joint may be opened and the four walls of the structure be swung into the position shown in Fig. 4. In this operation the wall 4 is swung downwardly and inwardly upon the proper surface of the wall 1, the wall 2 is swung downwardly upon the inner surface of the wall 3, and the walls 1 and 3 are then swung outwardly until their outer surfaces engage. Before swinging the wall 4, the frame 6 is disengaged from the upper wall 2 and swung downwardly flat upon the wall 1. Before swinging the wall 2, the flaps 14 are swung against the inner surface of the wall 2.

The hinge rod 16 may be inserted in the hinge portions of the wall 2 or 4 when the structure is collapsed, merely for convenience in carrying.

The hinge joint 17 between the walls 2 and 3, and likewise the hinge joint 18 between the walls 1 and 4, are so disposed, that in the collapsed condition the hinge joint serves to positively space the respective walls apart sufficiently far to accommodate the flaps 14 and the frame 6. The hinge joint 19 between the walls 1 and 3 is disposed so that in their collapsed condition the walls 1 and 3 will rest in substantial contact throughout their surfaces, the joint 19 itself being accommodated by the space formed by the joints 17 and 18 between the walls 2 and 3, and 1 and 4. With this arrangement the collapsed device requires very little more space than would be required for small pieces of sheet metal. For ordinary size traps the collapsed structure may be readily carried in the trapper's pocket, in fact, a number of traps may be thus carried without inconvenience.

To set the traps, it is simply necessary to swing apart the four walls, move the frame 6 into position so that the lug 12 engages in the recess 13 and insert the rod 16 to hold the structure in operative condition. This operation may be performed in a few seconds and without resorting to tools of any character. The traps are thoroughly substantial and practical for their purpose and may be manufactured at extremely small cost, no complicated machinery or even expert workmanship being required for their production.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which as a matter of language, might be said to fall therebetween.

Having thus described my invention what I claim as new and desire to secure by Letters Patent, is:

1. In an animal trap comprising a collapsible tubular structure, the combination of a member disposed within said tubular structure engaging the inner surfaces of some of the walls thereof for retaining said tubular structure against collapse, and an integral portion of said member being bent so as to serve as a bait attaching means.

2. In an animal trap comprising a collapsible tubular structure, the combination of a member disposed within said tubular structure engaging the inner surfaces of some of the walls thereof for retaining said tubular structure against collapse, said means comprising a length of wire having one end bent to form bait attaching means within the said tubular structure.

3. In an animal trap comprising a collapsible tubular structure, the combination of a member disposed within said tubular structure engaging the inner surfaces of some of the walls thereof for retaining said tubular structure against collapse, said means comprising an elongated member bent to form portions intermediate its length for engaging the walls and being bent at one end to form a bait attaching part.

4. In an animal trap comprising a collapsible tubular structure, the combination of a member disposed within said tubular structure engaging the inner surfaces of some of the walls thereof for retaining said tubular structure against collapse, said member being pivotally connected at one side to one of said walls, and bait carrying means formed upon said member at said mentioned side thereof.

5. In an animal trap comprising a collapsible tubular structure, the combination of a member disposed within said tubular structure engaging the inner surfaces of some of the walls thereof for retaining said tubular structure against collapse, said member comprising an elongated member having its ends bent to form pivot portions, means pivotally connecting said ends to one wall of said structure, and one of said ends being extended to form a bait attaching means.

6. In an animal trap comprising a collapsible tubular structure, the combination of a member disposed within said tubular structure engaging the inner surfaces of some of the walls thereof for retaining said tubular structure against collapse, said member being pivotally connected by one side to one wall of said structure, means at the other side of said member engaging another wall of said structure to hold said member in position retaining the structure against collapse, and means carried by the first mentioned side of said member for retaining bait within said structure.

7. An animal trap comprising a collapsible tubular structure having top and bottom walls and opposite side walls, all hinged together by means of hinges whose axes extend longitudinally of the structure, means for closing one of the ends of said tubular structure pivotally connected to one wall of said structure to swing on an axis extending transversely of the structure, said closing means being adapted to swing into substantial parallelism with said wall for facilitating collapse of said structure, and a bait supporting member for retaining said tubular structure in a non-collapsed condition, wherein said closing means is freely movable about its pivot.

8. A tubular collapsible animal trap comprising top and bottom walls and opposite side walls hinged together, said top wall being adapted to be collapsed toward one of said side walls, and said other side walls being adapted to be collapsed toward said bottom wall, means for closing the ends of said tubular structure carried by said top wall adapted to be collapsed against said top wall, means carried by said bottom wall for retaining the structure in non-collapsed position adapted to be collapsed against said bottom wall, and the hinges between said walls being extended so that when the structure is collapsed they retain said walls sufficiently spaced apart to accommodate said end closing means and the means for retaining the structure against collapse, the first mentioned side wall and said bottom wall being adapted to be collapsed toward each other, and the hinge between said last mentioned walls being adapted, when the structure is collapsed, to retain said last mentioned walls in substantial contact throughout their surface area.

9. In an animal trap comprising a collapsible structure, the combination of means for retaining said structure against collapse comprising a length of wire bent to form a frame and having one of its ends bent to form bait carrying means.

10. A collapsible animal trap, comprising a tubular structure formed of a plurality of pivotally connected members one of which is provided with an aperture, a frame pivoted to one of said members adapted to be swung into position to engage said members to prevent the collapse of said structure, and means carried by said frame adapted to enter said aperture and hold said frame in said last named position.

11. In an animal trap, in combination, a plurality of elongated members pivotally connected along their edges to form a tubular structure, a frame formed of a length of wire pivoted to one of said members, said frame being so bent that when it is moved to a transverse position with respect to said members it engages the inner walls thereof and prevent the structure formed thereby from collapsing, one of said members being provided with an aperture, and a lug carried by said frame adapted to enter said aperture and hold the frame in said last mentioned position.

In testimony whereof, I affix my signature in the presence of two witnesses.

ALBERT E. KINSLEY.

Witnesses:
 HARVEY PICKARD,
 JAMES MOORE.